Figure 2:
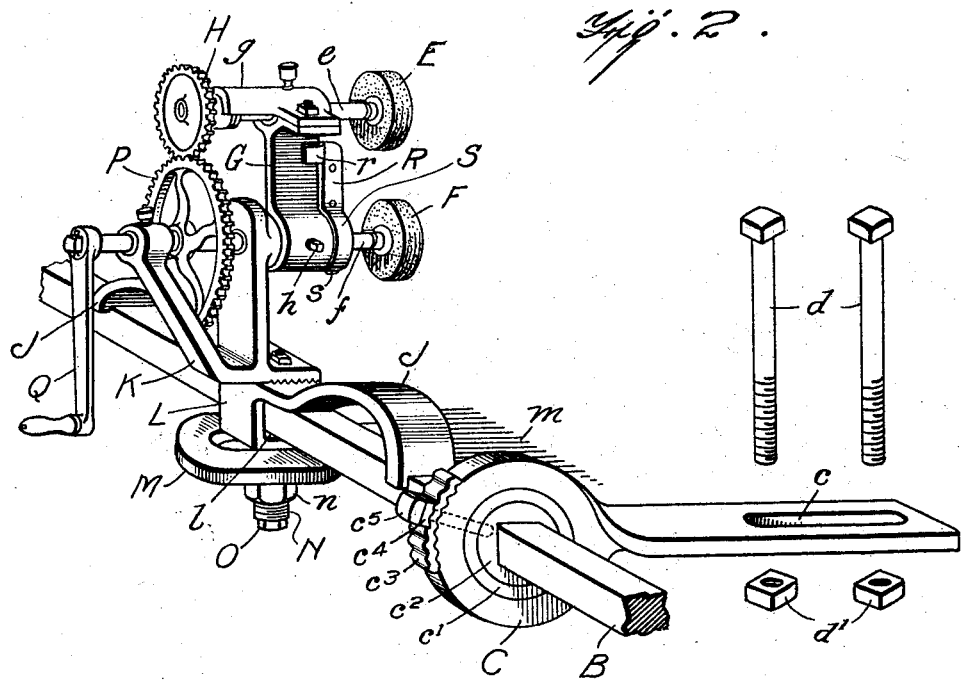

Z. M. BAIN.
DISK SHARPENER.
APPLICATION FILED OCT. 25, 1920.

1,406,716.  Patented Feb. 14, 1922.

Inventor
ZENO M. BAIN,
By Franklin H. Hough
Attorney

UNITED STATES PATENT OFFICE.

ZENO M. BAIN, OF COFFEE CREEK, MONTANA.

DISK SHARPENER.

1,406,716.  Specification of Letters Patent.  Patented Feb. 14, 1922.

Application filed October 25, 1920. Serial No. 419,472.

*To all whom it may concern:*

Be it known that I, ZENO M. BAIN, a citizen of the United States, residing at Coffee Creek, in the county of Fergus and State of Montana, have invented certain new and useful Improvements in Disk Sharpeners, of which the following is a specification, reference being had therein to the accompanying drawings.

This invention relates to grinding devices and has for an object to provide a grinding device especially, though not exclusively, adapted in association with to grind disks of a disk cultivating implement.

A further object of the invention is to provide a device adapted for attachment to the supporting structure of a disk implement without varying the structure, and with means for employing the rotation of the disks in use for actuating a grinding mechanism to grind the disks while so in action.

A further object of the invention is to provide a grinding mechanism adapted to be attached to a disk implement having a frictional disk adapted to engage frictionally against one side of the cultivating disk, and with a grinding wheel geared to the friction disk, whereby the rotation of the friction disk, under the impulse from the cultivating disk, grinds the cultivating disk.

With these and other objects in view, the device comprises certain novel units, elements, parts, features, combinations and arrangements of parts, as will be hereinafter more fully described and claimed.

Figure 1:
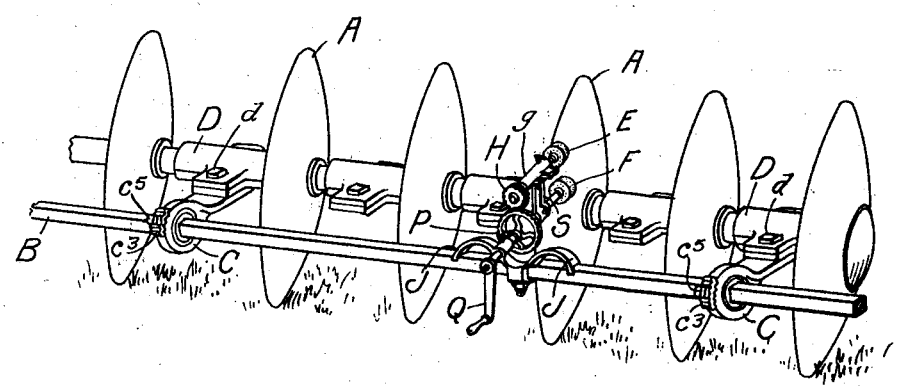

In the drawings:

Figure 1 is a perspective view of a conventional disk implement with the invention attached thereto in operative position; and Figure 2 is a perspective view of the implement removed from the cultivating device.

Like reference characters indicate corresponding parts throughout the several views.

The cultivating disk implement indicated at Figure 1, designated as A, is of the usual and ordinary type. At the rear of the battery of disks, so arranged, a bar B is supported upon brackets C. The brackets C are secured to the bearings D of the cultivating implement by means of bolts $d$. The brackets C provide bearings for the journal blocks $c^1$, which are circular upon the exterior and squared upon the interior, as shown at $c^2$, to engage the bar B. Upon the exterior, the bracket C is provided with corrugations $c^3$, with a clamping member $c^4$ and bolts $c^5$, by which the angular relation of the bar B to the bracket C, and consequently to the implement, may be adjusted. The bolt $c^5$ serves as a set screw for binding the bearing member $c^1$ in its relation to the bracket C. The bracket C is provided with a slot $c$ and bolts $d$, heretofore referred to, provided with the nuts $d^1$, and secured through the slot $c$ and serve to clamp the bracket C to the implement, as hereinbefore mentioned. The bolts $d$ are inserted through the keeper D, which clamps above the axis for bearing members of the disk implement with the bracket C underneath.

For grinding the disk, a grinding wheel E of any abrasive material is provided, mounted upon a shaft $e$, driven by the friction disk F, mounted upon its shaft $f$. Both of these shafts $e$ and $f$ are journaled in the member G, with the bearing block $g$, coacting with the member G for journaling the shaft $e$. The shaft $e$ is also provided with the gear H. The shaft $f$ is journaled in the bracket K, supported upon the block L, which is provided with an offset member $l$, inserted under the bar B, and to which it is clamped by the bolt $i$.

A plate M is secured beneath the member L by means of the set screw N, with the adjustments O and $n$ carrying upon its forward end the brush $m$, which engages the edge of the disk for cleaning the same before the grinding is accomplished. The member L is provided with curved wings J having their extremities bifurcated, the curves being such that when the device is moved along the bar B, the curves will span the bracket C, whereby the device may be moved without interference from the bracket C and at the same time be held rigidly by such wings J, both from lateral and pivotal movement.

The shaft $f$ is provided with a gear P, interengaging with the gear H, whereby, when the disk F is driven, as will be hereinafter more fully explained, the inter-gearing will rotate the grinding wheel E. A crank Q is provided upon the shaft $f$ for the purpose of manual actuation when such actuation is necessary, as for instance, when a notch has been broken in the cutting edge of a disk, and the disk is thereby rendered inoperative, the device is manually actuated to sharpen the broken edges of the fracture.

Upon the member K, the upright $t$ is employed, having a shoulder for the receipt of the sleeve of the member G, and retained in fixed relation thereto by the set screw $h$. A spring S is also secured thereon by the set screw $s$ and a bifurcated end $r$ is provided for engaging the member G so that the said member, together with the grinding disk E, may be moved to engage either side of the cutting disk. By adjustment of the member K upon the member L, by loosening and tightening the nut $i$, angular adjustment may be accomplished to provide the necessary bevel for the opposite sides of the disk when the disk is being ground.

In operation, the device is secured to the cultivating implement in the manner shown at Figure 1 with the disk F engaging one side of the cultivating disk A and the grinding wheel E properly arranged in engagement with the cutting edge of the disk to provide the necessary bevel therefor. As the implement is drawn along in the usual course of use, the engagement of the friction disk F and the gears H and P will drive the cutting wheel E, which has been adjusted to the proper angle so that the grinding of the cultivating disks is maintained during the operation of the same.

It will be noted that various adjustments have been provided for, whereby the implement is made flexible for use and adapted for use with implements varying in sizes, as to diameter of disk, concavity of disk, and bevel of cutting edges.

What I claim to be new is:

1. A grinding device comprising supporting arms, means to adjust the supporting arms to vary the relation with their supports, a bar adjustably secured upon the brackets, a bearing member slidable longitudinally upon the bar, means to fix the sliding member at various adjustments upon the bar, a bearing member carried by the sliding member, a shaft journaled in the bearing member, a friction disk carried by the shaft, a second shaft journaled in the bearing member, a grinding wheel carried by the second mentioned shaft, gears inter-gearing the shafts, means to adjust the bearing member relative to the bar, and means to adjust one of the shafts relative to, and independently of the bearing member.

2. The combination with a disk cultivating implement, embodying a battery of disks, of brackets adapted to be secured between the disks, a bar carried by the brackets, extending in parallelism with the axis of the battery of disks, means to adjust the relation of the bar relative to the brackets, a member slidable longitudinally upon the bar, a shaft journaled upon the sliding member, a friction disk carried by the shaft positioned and proportioned to engage frictionally one side of one of the disks, a second shaft journaled upon the sliding member, a grinding wheel carried by the second mentioned shaft positioned and proportioned to engage the edge of the disk, gears intergearing the shafts, means to adjust the shafts relative to the disk, and means to adjust the grinding shaft relative to the actuating shaft.

In testimony whereof I hereunto affix my signature in presence of two witnesses.

ZENO M. BAIN.

Witnesses:
CURTIS BURNS,
S. MAHURIN.